(12) United States Patent
Leanheart

(10) Patent No.: US 6,786,181 B1
(45) Date of Patent: Sep. 7, 2004

(54) ANIMAL CARRIER

(76) Inventor: Donna Leanheart, 11849 Farside Rd., Ellicott City, MD (US) 21042

( * ) Notice: Subject to any disclaimer, the term of this patent is extended or adjusted under 35 U.S.C. 154(b) by 0 days.

(21) Appl. No.: 10/689,829

(22) Filed: Oct. 22, 2003

(51) Int. Cl.[7] .............................................. A01K 31/08
(52) U.S. Cl. ....................... 119/453; 119/474; 119/499
(58) Field of Search ................................ 119/453, 474, 119/496, 498, 499, 753, 755, 756; 280/47.38, 639, 650, 647, 642; D12/128, 129; D30/109

(56) References Cited

U.S. PATENT DOCUMENTS

| | | | |
|---|---|---|---|
| 758,123 A | * | 4/1904 | Weis ........................... 297/484 |
| 3,522,904 A | | 8/1970 | Locke et al. |
| 3,865,425 A | | 2/1975 | French |
| 4,597,359 A | * | 7/1986 | Moorman ................... 119/28.5 |
| 4,660,850 A | | 4/1987 | Nakao et al. |
| D296,313 S | | 6/1988 | Kujawski |
| 4,796,565 A | * | 1/1989 | Charbeneau ................ 119/751 |
| D315,885 S | | 4/1991 | Jacobs |
| D325,364 S | | 4/1992 | Stilley |
| 5,113,793 A | | 5/1992 | Leader et al. |
| D332,591 S | | 1/1993 | Reely |
| 5,224,720 A | | 7/1993 | Chaw et al. |
| 5,305,710 A | | 4/1994 | Ward, Jr. |
| 5,370,408 A | * | 12/1994 | Eagan ................... 280/33.994 |
| 5,701,843 A | | 12/1997 | Lazides |
| 6,021,740 A | * | 2/2000 | Martz .......................... 119/497 |
| 6,374,775 B1 | | 4/2002 | Baumsteiger |
| 6,425,349 B1 | * | 7/2002 | Laskin et al. ................ 119/496 |
| 6,584,937 B1 | * | 7/2003 | Ludolph ...................... 119/453 |

* cited by examiner

Primary Examiner—Michael J. Carone
Assistant Examiner—T. Nguyen
(74) Attorney, Agent, or Firm—Donald R. Schoonover

(57) ABSTRACT

An animal carrier has a harness that includes two side-by-side animal body-encircling belts located inside a stroller. The body-encircling belts are connected to straps which are connected to the frame of the animal carrier. A sun shade unit is also included and can be placed over the animals carried in the carrier. A pad is removably located inside the carrier and an insect net accessory can be placed around the carrier. Wheels of the carrier include a brake and a cargo basket is also included.

6 Claims, 1 Drawing Sheet

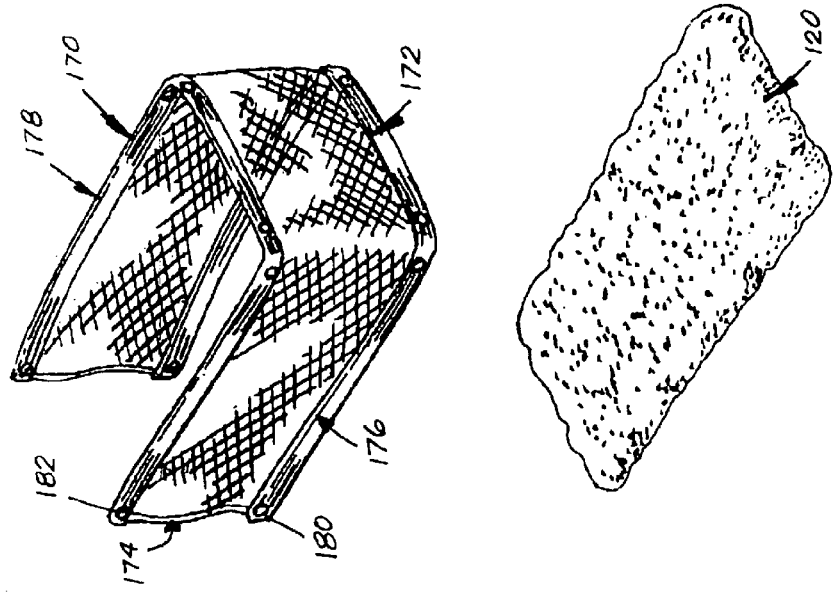
FIG. 2.
FIG. 3.
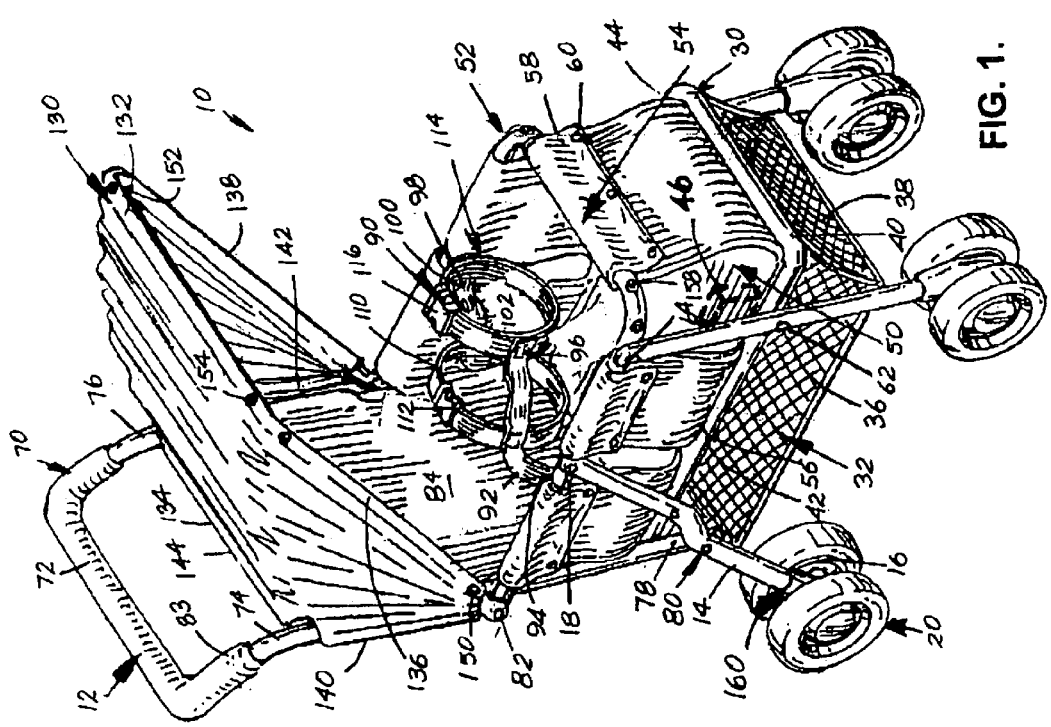
FIG. 1.

ANIMAL CARRIER

BACKGROUND OF THE INVENTION

1. Field of the Invention

The present invention relates to the general art of animals, and to the particular field of mobile animal carriers for pets.

2. Discussion of the Related Art

Many people have pets and most of these pets must be exercised at least once in a while. Often, people like to include the pet in their own exercise period, which may include, for example, a walk around a neighborhood lake. A common problem with some pets is that they eagerly begin an exercise period, such as a walk, but after some period tire and stop. This may require the owner to carry a small pet for some distance. At the least, this might be an annoyance for the owner. Other pets, for various reasons, may wish to get out but cannot walk well enough to be efficient. For example, larger pets that may have common hip problems are left at home instead of accompanying the owner on a pleasant walk when both the owner and pet would benefit.

Furthermore, some pets simply enjoy riding in a vehicle, and some pet owners enjoy taking their pet on errands such as to a store or the like. In some cases, the pet simply enjoys getting out with the owner and the owner simply enjoys taking the pet with them, for whatever reason. In some of these cases, it may not be convenient for the pet to walk, and the owner may want to transport the pet in a vehicle, other than an automobile or a bicycle. Moreover, after arriving at a destination by vehicle, or even airplane, the owner may wish to transport the pet in a mobile carrier that also fits going through standard size doorways.

Therefore, there is a need for a means to transport a pet with minimal inconvenience to the owner and which is comfortable for the pet.

While the art contains many examples of pet carriers, the presently-available devices have several drawbacks. Many of these devices are comparable to a cage, and not comfortable or enjoyable for the pet. For example, the size of the carrier may be too confining for some pets and does not allow the pet to appreciate the environment. Still further, the pet may be exposed to sunlight or insects during the ride, thereby making the pet uncomfortable. Still further, many of these devices are not easily cleaned. Even the cleanest of pets may shed its hair, and the shedding should be cleaned from any carrier on a routine basis. Still further, the devices may not easily go in and out of buildings where the owner may be able to take its pet.

Therefore, there is a need for a means to transport a pet and which is comfortable for the pet of various sizes, and which can be easily cleaned and which is easily manageable for the owner.

Still further, some pet carriers are bulky and take up a great deal of space when not in use. These carriers may also be bulky and difficult to transport. This is an especially onerous problem if the pet gets out of the carrier and wishes to walk on its own, thus leaving the owner to control the pet while also dealing with an empty and cumbersome carrier.

Therefore, there is a need for a means to transport a pet which is easily and conveniently stored and transported and which is easy to set up so the owner is not dissuaded from using the carrier.

Still further, depending on the weather, a pet carrier may be uncomfortable for one condition and very comfortable for others. For example, if the pet carrier is used in a situation where there are insects, such as in the woods, it will be advantageous if some form of netting could be used on the carrier; however, if there are no insects expected and the pet is a well-behaved pet, it will be advantageous to keep as much ventilation as possible and netting may interfere with such ventilation. Therefore, in the later-mentioned situation, netting may not always be desirable.

Therefore, there is a need for a means to transport a pet and which is versatile.

Many pet owners have more than one pet and the size of the pets vary. If these pets are taken for a walk, it is difficult to get all of the pets in a single carrier. In some cases, the pets will not sit still if more than one pet is in a single carrier. In such instances, using a common carrier is not possible, even if it is desirable. However, in some cases, pets will sit still and comfortably if more than one pet is in a single carrier, provided that the carrier is comfortable. For larger pets, it may be desirable to have only one pet in the carrier.

Therefore, there is a need for a means to transport a pet which can be adapted to use with one or more smaller pets , and can also be adaptable and accessible for larger pets.

PRINCIPAL OBJECTS OF THE INVENTION

It is a main object of the present invention to provide a means to transport a pet.

It is another object of the present invention to provide a mobile means to transport a pet and which is comfortable for the pet, which allows the pet to appreciate the environment, and which can be easily cleaned.

It is another object of the present invention to provide a means to transport a pet which is easily and conveniently stored in the collapsed form, transported in a vehicle, and then easily set up.

It is another object of the present invention to provide a means to transport a pet which can be adapted to use with one or more pets of varying sizes.

It is another object of the present invention to provide a means to transport a pet which is safe and is well-constructed thereby avoiding injury to pets when in use.

SUMMARY OF THE INVENTION

These, and other, objects are achieved by a pet carrier which comprises a collapsible frame having a mesh basket thereon, a seating element thereon, a plurality of spaced apart panels and a plurality of wheels; a harness unit which includes a first strap connected at one end thereof to the frame and having a second end, a second strap connected at one end thereof to the frame and having a second end, a first body-encircling belt connected to the first strap between the first end of the first strap and the second end of the first strap and which is also connected to the second end of the second strap, the first body-encircling belt being located adjacent to the seating element and having a buckle thereon, a second body-encircling belt connected to the second strap between the first end of the second strap and the second end of the second strap and which is also connected to the second end of the first strap, the second body-encircling belt being located adjacent to the seating element and having a buckle thereon, the second body-encircling belt being located immediately adjacent to the first body-encircling belt to be in side-by-side position with the first body-encircling belt, the body-encircling belts are both formed of flexible material that ensures comfort for the pet, and are connected together so the belts are securely fastened to the carrier and which belts may be flattened and moved off to the side of the carrier in instances where the pet is well-trained and content to sit in the carrier without using the harness; a pad removably mounted on the seating element of the frame; a sun shade unit mounted on the frame to be movable between a first position uncovering the seating element and a second position covering the seating element; a plurality of fastener units which are adapted to releasably couple the sun shade unit to the frame when the sun shade unit is in the second position; and a brake unit on at least one, preferably two, of the wheels.

The pet carrier embodying the present invention is thus very easy to use and is quite versatile. The pet carrier has pad which is removably located in the carrier and which can be easily removed and washed. Accessories such as insect or mesh netting, or the like, can be easily added to make the carrier as comfortable as possible for the pets being transported in the carrier, and/or the netting serves as a barrier in the event the owner has the pet in circumstances where he does not want the pet easily accessible to, for example, the hands of curious children.

Still further, as mentioned above, the pet carrier embodying the present invention has a safety belt strap. The safety belt strap has two side-by-side body-encircling belts that are flexible so different size pets can be accommodated in a comfortable, yet secure, manner. In this manner, more than one pet can be easily accommodated in a manner that will inhibit activities that may be disturbing to the owner or to the other pet. Also, the pets will be restrained so they will not be able to jump out of the carrier. In fact, it may even be considered that the pets are on a leash.

BRIEF DESCRIPTION OF THE DRAWING FIGURES

FIG. 1 is a perspective view of an animal carrier embodying the present invention.

FIG. 2 is a perspective view of an accessory for use with the animal carrier embodying the present invention.

FIG. 3 is a perspective view of a pad that is used in conjunction with the animal carrier shown in FIG. 1.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a pet carrier 10. Pet carrier 10 comprises a frame unit 12 which includes four leg elements, such as leg element 14. The leg elements are identical and each leg element includes a first end 16 and a second end 18.

A wheel, such as wheel 20, is mounted on the first end 16 of each leg 14, In the form shown in FIG. 1, there are four wheels and each wheel includes a double wheel assembly.

A first support frame element 30 is pivotably connected to each leg element 14 of the four leg elements. The first frame element 30 is adapted to move between a first orientation, see FIG. 1, that is essentially horizontal to a support surface, such as the ground, and a second orientation that is essentially vertical to the support surface.

A cargo basket 32 is pivotably connected to each leg element 14 of the four leg elements. The cargo basket 32 is adapted to move between a first orientation (shown in FIG. 1) that is essentially horizontal to the support surface and a second orientation that is essentially vertical to the support surface. The cargo basket 32 includes a first mesh element 36 and a second mesh element 38 that is connected to the first mesh element 36 and to the first support frame element 30. The frame unit 12 includes a first end 40, a second end, a first side 42, and a second side 44. The second mesh element 38 is located on the first end 40 of the frame element 30. Cargo, such as water for the animals, can be carried in the cargo basket 32 as desired. The second mesh element 38 will prevent the cargo in the cargo basket 32 from falling out of the cargo basket 32. For carriers that are constructed for larger animals, the area that the cargo basket occupies might be replaced instead by a feature that allows the owner to, at his or her option, lower the support frame, including the seating element, so that the large animal may enter the carrier with less assistance from the owner. Alternatively, the present invention may include means 46, shown schematically in dashed lines in FIG. 1, for lowering and raising the support frame may include a compressed air mechanism. When the air is decompressed or released by, for example, use of a pedal or hand pump, the support frame would lower. By pumping a pedal or hand pump-type apparatus, the own can raise the height of the seating element once the animal has entered the carrier.

A seating element 50 is connected to the first support element 30, and is formed of material such as canvas or the like in one form of the invention.

A second support frame element 52 is pivotably connected to each leg element 14 of the four leg elements. The second frame element 52 is adapted to move between a first orientation (shown in FIG. 1) that is essentially horizontal to the support surface and a second orientation that is essentially vertical to the support surface. The second support frame element 52 is spaced apart from the first support frame element 30.

A plurality of spaced apart flexible panels, such as panel 54, are also included in the pet carrier 10. Each panel 54 has a first end 56 connected to the seating element 50 and a second end 58 that is adapted to be releasably connected to the second support frame element 52. Each panel 54 includes a snap fastener unit 60 adjacent to the second end thereof 58.

A pivot connection 62 is located between the first support frame element 30 and each leg element 14 and a pivot connection 64 is located between the second support frame element 52 and each leg element 14. The pivot connections are formed by suitable pivot pins that permit the frame elements 30, 52 to move as discussed above.

A U-shaped handle 70 has a bight section 72, a first leg 74, and a second leg 76. Each of the legs 74, 76 of the handle 70 has a first end 78 pivotably connected to one leg element 14 of the four leg elements by a pivot pin 80.

A pivot connection, such as pivot connection 82, is located between each leg 74, 76 of the handle 70 and the second support frame element 52.

A cover 83 is located on the bight section 72 of the handle 70.

A flexible back element 84 is connected to the legs 74, 76 of the handle 70 and to the seating element 50.

The seating element 50 and the panels 54 and the back element 84 being one piece with each other, and can be formed of canvas or like material.

The pet carrier 10 further includes a harness unit 90. Harness unit 90 includes a first strap 92 having a first end 94 connected to the second support frame element 52 and a second end 96 spaced apart from the first end 94 of the first strap 92 and located adjacent to the seating element 50. A second strap 98 has a first end 100 connected to the second support frame element 52 and a second end 102 spaced apart from the first end 100 of the second strap 98 and located adjacent to the seating element 50.

A first body-encircling belt 110 is connected to the first strap 92 between the first end 94 of the first strap 92 and the second end 96 of the first strap 92 and is also connected to the second end 102 of the second strap 98. The first body-encircling belt 110 is located adjacent to the seating element 50 and has a buckle 112 thereon.

A second body-encircling belt 114 is connected to the second strap 98 between the first end 100 of the second strap 98 and the second end 102 of the second strap 98. The second body-encircling belt 114 is also connected to the second end 96 of the first strap 92. The second body-encircling belt 114 is located adjacent to the seating element 50 and has a buckle 116 thereon. The second body-encircling belt 114 is located immediately adjacent to the first body-encircling belt 110 to be in side-by-side position with the first body-encircling belt 110. The first body-encircling belt 110 and the second body-encircling belt 114 are formed of flexible material. The flexible materials will permit the belts 110, 114 to be placed comfortably, yet securely around a pet to hold the pet in place no matter what size the pet may be. The buckles 112, 116 can also be adjusted to fit the pet. Using the harness 90 of the present invention 10, more than one pet can be safely accommodated in the pet carrier and the pets will be restrained as on a leash and will likely remain in the pet carrier 10. Since the body-encircling belts 112, 116 are fastened to the straps 92, 98 in the manner described, the body-encircling belts 110, 114 are also coupled together which adds to the security of the harness unit 90.

A pad 120 is shown in FIG. 3 and is removably supported on the seating element 50. The pad 120 in the form shown is formed of lambswool and is easily cleaned.

The pet carrier 10 further includes a sun shade unit 130 which includes a first end 132, a second end 134, a first side 136, a second side 138, a first intermediate portion 140, and a second intermediate portion 142. The first side 136 of the sun shade unit 130 is pivotably connected to the second support frame element 52 and the second side 138 of the sun shade unit 130 is pivotably connected to the second support frame element 52. The first intermediate portion 140 of the sun shade unit 130 is connected to the first leg 74 of the handle 70. The second intermediate portion 142 of the sun shade unit 130 is connected to the second leg 76 of the handle 70. A third intermediate portion 144 of the sun shade unit 130 extends between the first and second legs 74, 76 of the handle 70.

The sun shade unit 130 is movable between a first position (shown in FIG. 1) uncovering the seating unit 50 with the first end 132 of the sun shade unit 130 spaced apart from the second support frame element 52 and a second position covering the seating unit 50 with the first end 132 of the sun shade unit 130 located adjacent to the second support frame element 52. The sun shade unit will include a clear plastic see-through portion so the owner can at all times observe the pet or pets in the carrier while pushing the carrier.

A plurality of snap fastener elements, such as snap fastener element 150, are located on the first side 136 of the sun shade unit 130. A plurality of snap fastener elements, such as snap fastener element 152, are located on the second side 138 of the sun shade unit 130. A plurality of snap fastener elements, such as snap fastener element 154, are located on the first end 132 of the sun shade unit 130, and a plurality of mating snap fastener elements, such as mating snap fastener element 158, are located on the second support frame element 52. The mating snap fastener elements 158 are located to be adapted to releasably mate with the snap fastener elements on the sun shade unit 130 when the sun shade unit 130 is in the second position covering the seating element 50.

A brake unit 160 is located on at least one of the wheels 20. The brake unit 160 can be a foot-operated brake and is used to control movement of the pet carrier 10.

As discussed above, the pet carrier 10 embodying the present invention is amenable to use with a plurality of accessories. One such accessory is shown in FIG. 2 as being an insect netting unit 170. The insect netting unit 170 is removably attachable to the second frame element 52 of the pet carrier 10 and to the sun shade 130 of the carrier 10 so the netting 170 can be used as needed. As shown in FIG. 2, the insect netting unit 170 includes a first end 172, a second end 174, a first side 176, and a second side 178. A plurality of first fastener elements, such as first fastener element 180, are located on the first and second sides 176, 178 of the netting unit 170 and on the first end 172 of the netting unit 170. The first fastener elements 180 on the netting unit 170 are adapted to releasably mate with the mating snap fastener elements on the second frame element 52. A plurality of second fastener elements, such as second snap fastener element 182, are located on the first and second sides 176, 178 of the netting unit 170 and on the first end 172 of the netting unit 170. The second fastener elements 182 on the netting unit 170 are adapted to releasably mate with the mating snap fastener elements on the sun shade unit 130. When the insect netting is in place, the sun shade 130 is in the seating unit 50 uncovering position discussed above.

It is understood that while certain forms of the present invention have been illustrated and described herein, it is not to be limited to the specific forms or arrangements of parts described and shown.

What is claimed and desired to be covered by Letters Patent is:

1. A pet carrier comprising:
 a) a frame unit which includes
  (1) four leg elements, each leg element including a first end and a second end,
  (2) a wheel on the first end of each leg,
  (3) a first support frame element pivotably connected to each leg element of the four leg elements, the first frame element being adapted to move between a first orientation that is essentially horizontal to a support surface and a second orientation that is essentially vertical to the support surface,
  (4) a cargo basket which is pivotably connected to each leg element of the four leg elements, the cargo basket being adapted to move between a first orientation that is essentially horizontal to the support surface and a second orientation that is essentially vertical to the support surface, the cargo basket including a first mesh element and a second mesh element connected to the first mesh element and to the first support frame element, which cargo basket may include a mechanism for raising and lowering the seating element,
  (5) a seating element connected to the first support element,
  (6) a second support frame element pivotably connected to each leg element of the four leg elements, the second frame element being adapted to move between a first orientation that is essentially horizontal to the support surface and a second orientation that is essentially vertical to the support surface, the second support frame element being spaced apart from the first support frame element,
  (7) a plurality of spaced apart flexible panels, each panel having a first end connected to the seating element and a second end adapted to be releasably connected to the second support frame element, each panel including a snap fastener unit adjacent to the second end thereof,
  (8) a pivot connection between the first support frame element and each leg element,
  (9) a pivot connection between the second support frame element and each leg element,

(10) a U-shaped handle having a bight section, a first leg, and a second leg, each of the legs of the handle having a first end pivotably connected to one leg element of said four leg elements,
(11) a pivot connection between each leg of the handle and the second support frame element,
(12) a cover on the bight section of the handle,
(13) a flexible back element connected to the legs of the handle and to the seating element, and
(14) the seating element and the panels and the back element all being one piece with each other;
b) a harness unit which includes
(1) a first strap having a first end connected to the second support frame element and a second end spaced apart from the first end of the strap and located adjacent to the seating element,
(2) a second strap having a first end connected to the second support frame element and a second end spaced apart from the first end of the second strap and located adjacent to the seating element,
(3) a first body-encircling belt connected to the first strap between the first end of the first strap and the second end of the first strap and also being connected to the second end of the second strap, the first body-encircling belt being located adjacent to the seating element and having a buckle thereon,
(4) a second body-encircling belt connected to the second strap between the first end of the second strap and the second of the second strap, the second body-encircling belt also being connected to the second end of the first strap, the second body-encircling belt being located adjacent to the seating element and having a buckle thereon, the second body-encircling belt being located immediately adjacent to the first body-encircling belt to be in side-by-side position with the first body-encircling belt,
(5) the first and second body-encircling belts each being formed of flexible material, and
(6) the first and second body-encircling belts being coupled together via the first and second straps;
c) a pad removably supported on the seating element;
d) a sun shade unit which includes
(1) a first end,
(2) a second end,
(3) a first side,
(4) a second side,
(5) a first intermediate portion,
(6) a second intermediate portion,
(7) the first side of said sun shade unit being pivotably connected to the second support frame element,
(8) the second side of said sun shade unit being pivotably connected to the second support frame element,
(9) the first intermediate portion of said sun shade unit being connected to the first leg of the handle,
(10) the second intermediate portion of said sun shade unit being connected to the second leg of the handle,
(11) a third intermediate portion of said sun shade unit, the third intermediate portion extending between the first and second legs of the handle,
(12) said sun shade unit being movable between a first position uncovering the seating unit with the first end of said sun shade unit spaced apart from the second support frame element and a second position covering the seating unit with the first end of said sun shade unit located adjacent to the second support frame element,
(13) a plurality of snap fastener elements on the first side of said sun shade unit,
(14) a plurality of snap fastener elements on the second side of said sun shade unit,
(15) a plurality of snap fastener elements on the first end of said sun shade unit,
(16) a plurality of mating snap fastener elements on the second support frame element, the mating snap fastener elements being located and adapted to releasably mate with the snap fastener elements on said sun shade unit when said sun shade unit is in the second position, and
(17) a transparent see-through portion; and
e) a brake unit on at least one of the wheels.

2. The pet carrier as described in claim 1 further including a netting unit which includes a first end, a second end, a first side, a second side, a plurality of first fastener elements on the first and second sides of said netting unit and on the first end of said netting unit, the first fastener elements on said netting unit being adapted to releasably mate with the mating snap fastener elements on the second frame element, and a plurality of second fastener elements on the first and second sides of said netting unit and on the first end of said netting unit, the second fastener elements on said netting unit being adapted to releasably mate with the mating snap fastener elements on said sun shade unit.

3. A pet carrier comprising:
a) a collapsible frame having a mesh basket thereon, a seating element thereon, a plurality of spaced apart panels and a plurality of wheels;
b) a harness unit which includes
(1) a first strap connected at a first end thereof to said frame and having a second end,
(2) a second strap connected at a first end thereof to said frame and having a second end,
(3) a first body-encircling belt connected to the first strap between the first end of the first strap and the second end of the first strap and also being connected to the second end of the second strap, the first body-encircling belt being located adjacent to the seating element and having a buckle thereon,
(4) a second body-encircling belt connected to the second strap between the first end of the second strap and the second end of the second strap, the second body-encircling belt also being connected to the second end of the first strap, the second body-encircling belt being located adjacent to the seating element and having a buckle thereon, the second body-encircling belt being located immediately adjacent to the first body-encircling belt to be in side-by-side position with the first body-encircling belt,
(5) the first and second body-encircling belts each being formed of flexible material, and
(6) the first and second body-encircling belts being connected together via the first and second straps;
c) a pad removably mounted on the seating element of said frame;
d) a sun shade unit mounted on said frame to be movable between a first position uncovering the seating element and a second position covering the seating element;
e) a plurality of fastener units which are adapted to releasably couple said sun shade unit to said frame when said sun shade unit is in the second position; and
f) a brake unit on at least one of the wheels.

4. The pet carrier as described in claim 1 wherein said frame unit includes a first end, a second end, a first side and a second side, and the second mesh element is located on the first end of said frame element.

5. The pet carrier as described in claim 4 wherein each wheel includes a double wheel unit thereon.

6. The pet carrier as described in claim 1 wherein said pad is formed of lambswool.

* * * * *